United States Patent [19]

Schad

[11] 4,448,741

[45] May 15, 1984

[54] METHOD OF MOLDING PLASTIC WORKPIECES ABOUT SLENDER PERMANENT INSERTS

[75] Inventor: Robert D. Schad, Toronto, Canada

[73] Assignee: Husky Injection Molding Systems Ltd., Bolton, Canada

[21] Appl. No.: 352,215

[22] Filed: Feb. 25, 1982

Related U.S. Application Data

[63] Continuation-in-part of Ser. No. 327,900, Dec. 7, 1981, Pat. No. 4,422,995.

[51] Int. Cl.³ .................... B29D 3/00; B29D 12/02; B29C 6/02
[52] U.S. Cl. .................... 264/251; 264/254; 264/275
[58] Field of Search ........... 264/275, 255, 250, 279, 264/245, 251, 254

[56] References Cited

U.S. PATENT DOCUMENTS

| | | | |
|---|---|---|---|
| 2,604,661 | 7/1952 | Karns | 264/275 |
| 3,381,736 | 5/1968 | Ford et al. | 264/275 |
| 4,201,209 | 5/1980 | Leveen et al. | 264/255 |
| 4,348,348 | 9/1982 | Bennett et al. | 264/255 |

Primary Examiner—Willard E. Hoag
Attorney, Agent, or Firm—Karl F. Ross

[57] ABSTRACT

In injection-molding a plastic workpiece about a prefabricated permanent insert, a first quantity of plastic material is injected into one or more first-shot cavities through which a portion of the insert extends, thereby forming a corresponding number of annular spacers around that portion. After the spacer or spacers have solidified, the spacer-carrying insert is transferred to a second-shot cavity in which each spacer holds the insert separated from the walls of adjoining cavity sections. A second quantity of plastic material is then injected into the second-shot cavity to complete the workpiece by forming a sheath around the insert incorporating the spacer or spacers which are steadying same against lateral movement due to the pressure of the injected second-shot plastic.

5 Claims, 13 Drawing Figures

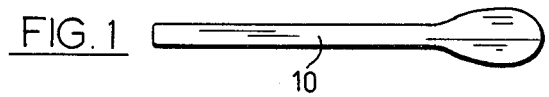
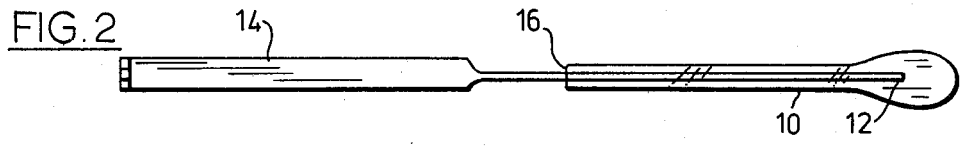
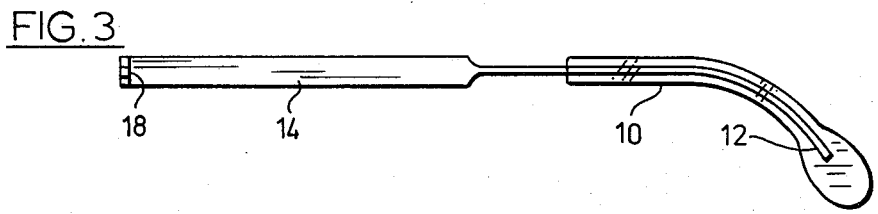
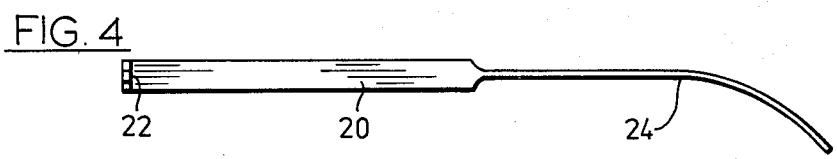
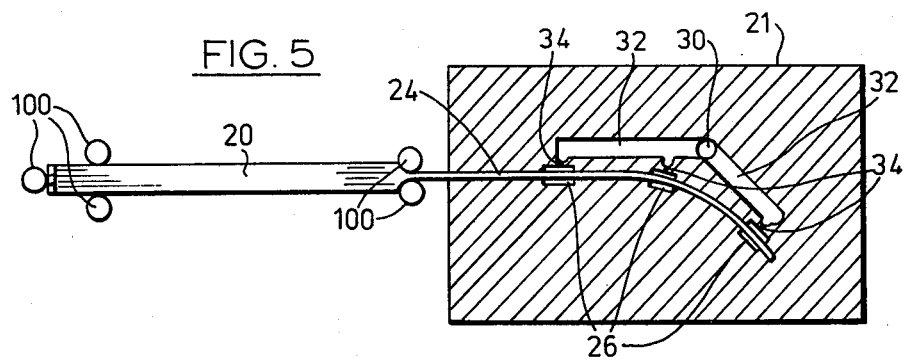
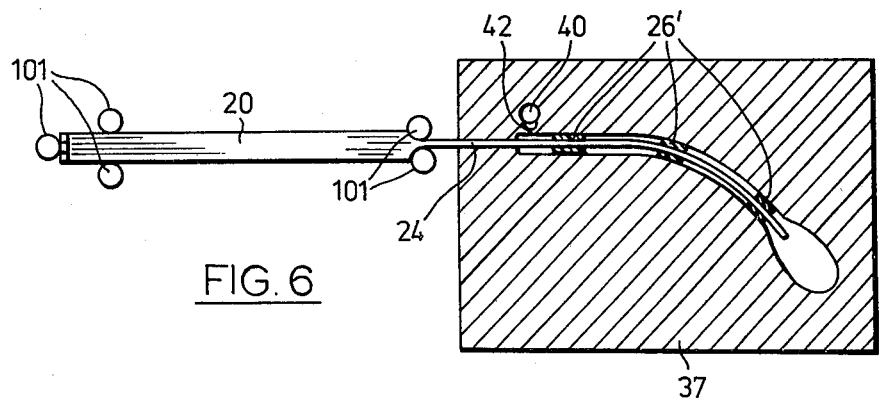

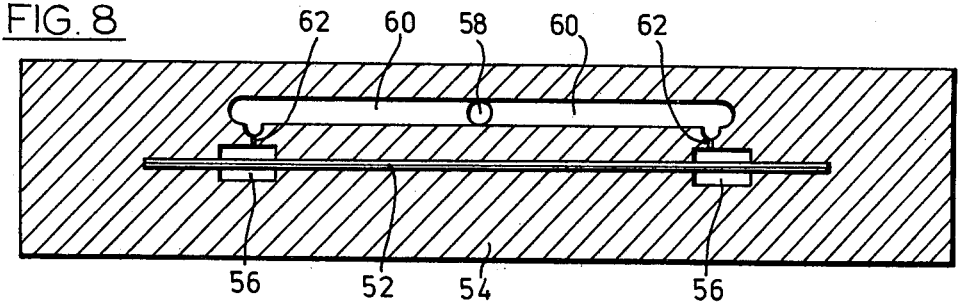
FIG. 7
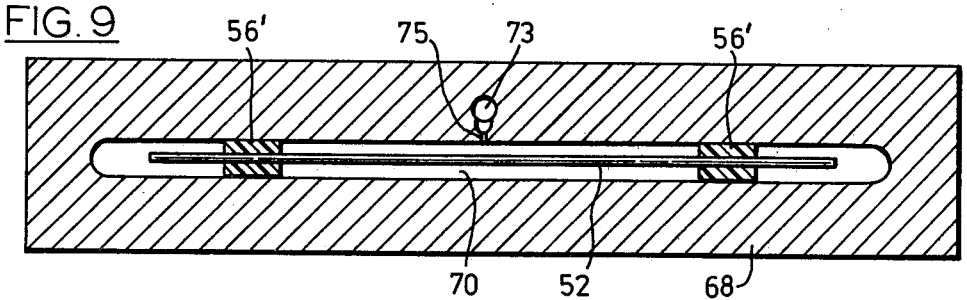
FIG. 8
FIG. 9
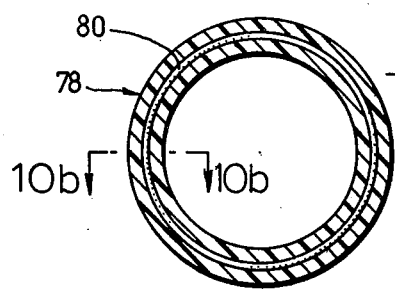
FIG. 10a
FIG. 10b
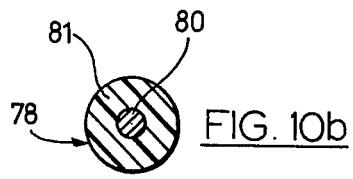
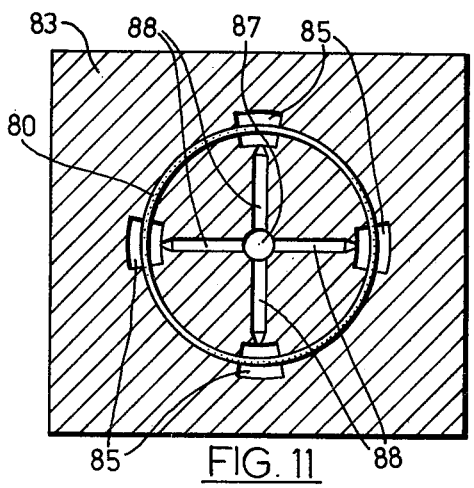
FIG. 11
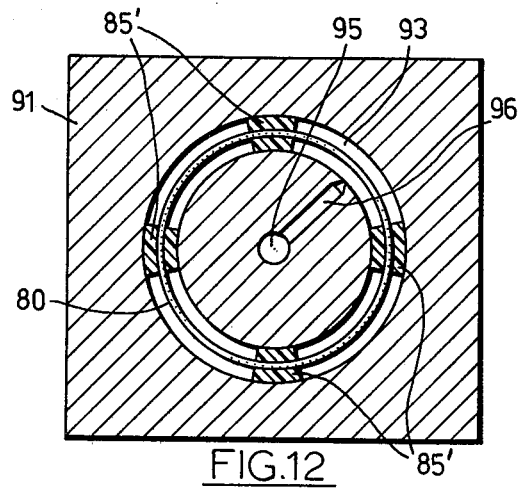
FIG. 12

METHOD OF MOLDING PLASTIC WORKPIECES ABOUT SLENDER PERMANENT INSERTS

This application is a continuation-in-part of U.S. Pat. application Ser. No. 327,900, filed on Dec. 7, 1981, now U.S. Pat. No. 4,422,995.

The disclosure of the prior application identified above relates generally to a method and apparatus for molding hollow, slender parts such as test tubes, pipettes, and the like, and has to do particularly with problems which arise when the central core (defining the internal surface of the part to be molded) is shifted or displaced due to the high pressure of the injected plastic during the injection process.

Such shifting or displacement can take place when the central core is particularly long and slender, and is only end-supported. In such cases, the core is typically too weak to offer any substantial resistance to the high injection pressure required to fill the mold cavity in the process of injection molding. As a result, the core tends to be displaced laterally.

The essence of the invention set forth in the prior application identified above is the concept of molding the part in question by two successive injection cycles from one or two injection systems. The first injection creates a spacer element (one or more) which is formed against and at least partly surrounding the core at a location spaced from the normal core support. This is done in a mold cavity through which only a part of the core extends. In this manner, the core is firmly supported adjacent the location where the spacer element is to be formed, thus ensuring accurate dimensioning of the spacer element. After the spacer element has solidified, the core, along with the spacer element is transferred to a second cavity in which the spacer element snugly spaces the core from the walls of the second cavity. Since the spacer element has now solidified, its presence will not permit the core to move when plastic is injected into the second cavity. The spacer element may have relieved portions or grooves which allow plastic injected into the second mold cavity to flow past the spacer element to a portion of the cavity which is remote from the injection location (gate) with respect to the spacer element. By using the same material for the first and second injections, the two injected masses will fuse and create an invisible joint. Alternatively, different plastic materials can be used for the two injections, thereby providing a coloured or striped effect in the final product.

BACKGROUND OF THIS INVENTION

It has now been appreciated that the general principle set forth in the prior application identified above has usefulness going well beyond the molding of hollow, slender parts.

For example, there are many instances in the manufacturing industry where it is desirable to provide a metallic or other stiff insert either entirely or partly within a molded plastic part, and in which the plastic part and the insert may both be relatively elongated. Particularly where the insert is to be entirely buried within the plastic part, the plastics industry has not discovered any reliable method by which to accurately position the insert within the part. As already pointed out, and especially in the case of elongated parts and elongated inserts, there is a strong tendancy during the injection molding process for the injected and highly pressurized plastic to push the insert to one side or the other of the cavity in which the part is to be molded, thereby causing the final part to be rejected, in many cases. In the case where the insert extends partly out of the molded plastic, there is the possibility of cantilevering the insert into the mold cavity in which the part is to be molded. However, here again, especially in the case of particularly long and slender cantilevered inserts, the pressurized plastic during its injection will tend to push the cantilevered end of the insert to one side or the other, thus preventing it from being centrally located in the final item.

A case in point relates to the manufacture of "wings" for eyeglasses. Most eyeglasses currently in use have plastic wings which are reinforced with a steel wire passing down the centre. The steel wire terminates in the hinge portion which connects the wing to the eyeglass frame, and most of the wire is inside the plastic. The present method for producing these wings involves firstly molding the plastic wings without any insert, and without any curvature. Then, an operator manually pushes a previously heated wire length-wise into the straight plastic piece. This operation requires a considerable amount of skill, in order to prevent the wire from straying from the centre of the wing. The incidence of scrap is very high. After the hot wire has been inserted, the wing is then bent or curved to its desired final shape.

The foregoing is only one problem among many encountered in the plastics industry, where it is required that a central insert be provided within a elongate part.

GENERAL DESCRIPTION OF THIS INVENTION

Generally, the present invention employs the concept of a two-shot molding procedure to the problem of providing an insert within a plastic part.

More particularly, this invention provides a method for injection molding a plastic part about a permanent insert, in which the method includes the following steps. Firstly, a first quantity of plastics material is injection molded into a first mold cavity through which part of the insert extends, thereby providing a spacer element against that part of the insert. The spacer element is then allowed to solidify, following which the insert and the spacer element are transferred to a second mold cavity in which the spacer element spaces the insert from the walls of the second mold cavity, thus supporting the same against lateral movement. Finally, a second quantity of plastics material is injection molded into the second mold cavity to complete the part.

Further, this invention provides an apparatus for use with an injection molding machine, the apparatus permitting the molding of a plastic part about a permanent insert. The apparatus includes first molding means defining a first mold cavity through which part of the insert can extend, together with first access means for allowing a first quantity of plastics material to be injected into the first mold cavity to provide a spacer element against the part of the insert. The apparatus further includes second mold means defining a second mold cavity adapted to receive more than the previously defined part of the core, in such a manner that the spacer element supports its part of the core against lateral movement. Second access means is provided allowing a second quantity of plastics material to be injected into the second mold cavity to complete the part. General Description of the Drawings Three embodiments of this invention are illustrated in the accompanying drawings, in which like numerals denote like parts throughout the several views, and in which:

FIG. 1 is a view of a molded eyeglass wing blank, as used in the prior art;

FIGS. 2 and 3 show subsequent steps in the conventional manufacture, of an eyeglass wing;

FIG. 4 is a view of an insert for use with this invention;

FIG. 5 shows the positioning of the insert of FIG. 4 into a mold block defining spacer cavities;

FIG. 6 is a view of a mold block defining the second cavity to produce the final item;

FIG. 7 is a sectional view of a representative elongate part with a wholly enclosed insert;

FIGS. 8 and 9 are views of a first shot cavity and a second shot cavity, respectively, for manufacturing the part of FIG. 7;

FIG. 10a shows an annular part with a wholly enclosed insert, taken in the section perpendicular to the axis;

FIG. 10b shows the same part as FIG. 10a, in radial section, and

FIGS. 11 and 12 show the first shot cavity and the second shot cavity, respectively, for manufacturing the part shown in FIGS. 10a and 10b.

DETAILED DESCRIPTION OF THE DRAWINGS

FIGS. 1, 2 and 3 represent the prior art in relation to the manufacture of wings for eyeglasses.

In FIG. 1, the elongate, plastic part 10 is formed first, without any insert. Then, in a manual operation requiring considerable skill and experience, the heated end 12 of a metallic member 14 is inserted from the left end 16 of the part 10. It is difficult to keep the slender portion 12 of the member 14 centralized with respect to the part 10, and this results in many rejected parts.

Finally, as shown in FIG. 3, the thin portion 12 and the part 10 are bent to an appropriate angle, to provide the ultimate wing for the eyeglasses. A hinge 18 is shown at the leftward end of the metallic member 14.

Utilizing the invention disclosed herein, the part shown in FIG. 3 would be manufactured as follows. First, a metallic insert 20 would be prepared in its final form, as shown in FIG. 4. The insert includes the standard hinge 22 and the slender, curved portion 24.

Next, as can be seen in FIG. 5, the insert 20 is positioned by locators 100 so that the portion 24 is lodged in an appropriately shaped cavity which snugly embraces the portion 24 at all locations except for one or more enlarged cavities 26, to which a plastic feed system is adapted to feed injected molten plastic. More specifically, the feed system includes a feed riser 30, two runners, 32, and a number of gates 34 sufficient to feed all of the spacer cavities. In the illustration of FIG. 5, three spacer cavities are provided.

Molten plastic is injected into the spacer cavities 26, and this plastic is allowed to solidify around and adhere to the portion 24. Following this step, the insert 20, including the portion 24 and the solidified spacers 26' are removed from the first mold block 21 and positioned within a second mold block 37 having the second shot cavity 38 defining the final shape of the plastic part. The mold block 37 includes a feed passage 40 and at least one gate 42. Locators 101 position the insert correctly. It can be seen in FIG. 6 that the spacers 26' are positioned at close enough spacings to allow the portion 24 to be held in a relatively rigid manner at a central location within the cavity 38.

Where molten injected plastic must move from one side of the spacer 26' to the other, as in the arrangement shown in FIG. 6, the individual spacers would be shaped in such a way as not to take up the entire cross-section of the second shot cavity 38. Alternatively, a runner could be positioned along the cavity 38 with separate gates into each region between pairs of spaced-apart spacers 26'.

Molten plastic is then injected into the second shot cavity 38, and is allowed to solidify to create the final shape.

The two plastic injections may use the same plastic or different plastic, depending upon the final effect required. By using the same plastic material, the joint between the spacers 26' and the remainder of the plastic material would become invisible. By using different colours, a striped or banded effect can be created.

FIGS. 7, 8 and 9 show a further embodiment, in which a representative part 50 has a wholly enclosed insert 52 within it. The insert 52 may be a reinforcement, a magnet, or any other item that must be totally enclosed centrally within a plastic part.

FIG. 8 shows a mold block 54 having a cavity for snugly receiving the insert 52 with the exception of two spaced-part spacer cavities 56. A feed passage 58 delivers molten injected plastic to side runners 60, the runners 60 providing the plastic through appropriate gates 62 to the spacer cavities 56.

After plastic has been injected into the spacer cavities 56 and has been allowed to solidfy, the insert 52 and the solidified spacers 56' are removed from the first mold block 54 and are placed in a second mold block 68 which contains a cavity 70 defining the final shape of the part. As can be seen in FIG. 9, the spacers 56' hold the insert 52 in its desired location. A feed runner 73 and a gate 75 again allow plastic to be injected into the second shot cavity 70.

Again, as with the embodiments shown in FIGS. 4–6, it may be necessary to ensure that the spacers 56' do not take up the entire cross-section of the second shot cavity 70, particularly where only a single feed gate entry is provided to allow plastic access to the second shot cavity 70.

Attention is now directed to FIGS. 10–12.

As can be seen in FIG. 10a, the part 78 has a ring-like insert 80 within an annular outer plastic portion 81.

To manufacture the part shown in FIGS. 10a and 10b, the insert 80 is first placed into a tightly conforming annular cavity within a first mold block 83, also provided with enlarged spacer cavities 85 at spaced intervals around the insert 80. In the particular embodiment illustrated, there are 4 spacer cavities 85 located at angular separations of 90°. A central feed passage 87 delivers molten pressurized plastic to 4 runners 88, which deliver plastic through the conventional gates to the spacer cavities 85. After the plastic in the spacer cavities 85 has solidified, the insert 80 and the spacers 85' are removed from the first mold block 83 and placed in a second mold block 91 having an annular cavity 93 defining the final shape of the annular part 78. In FIG. 12, a single feed passage 95 delivers plastic along at least one runner 96 which delivers the plastic through a gate into the annular cavity 93. Again, where the number of runners 96 is limited, the spacers 85' may need to be shaped in such a way as not to take up the entire cross-section of the annular cavity 93.

In situations where an insert partly projects out of the plastic part, some locating and positioning means may be required to ensure that the portion of the insert that is within the plastic is properly positioned. FIGS. 5 and 6 illustrate this possibility.

While specific embodiments of this invention have been illustrated in the accompanying drawings and described in the foregoing disclosure, it will be apparent to those skilled in the art that changes and modifications may be made therein without departing from the essence of this invention, as set forth in the accompanying claims.

I claim:

1. A method of injection-molding a workpiece of plastic material containing a prefabricated slender insert permanently embedded therein, comprising the steps of:
   (a) introducing at least part of the prefabricated insert into a first mold portion which defines a generally annular first-shot cavity encircling a portion of the insert so introduced, said cavity being such as to form a spacer with an axially throughgoing recess adjacent the spacer periphery;
   (b) injecting plastic material into said first-shot cavity to form a generally annular spacer with an axial recess therein;
   (c) upon hardening of said spacer and removal thereof together with said insert from said first mold portion, introducing said insert with said spacer into a second mold portion having a second-shot cavity, of greater length than said first-shot cavity, divided along a centerline thereof by said spacer into two sections within which said insert is held substantially centered by positive contact of said spacer on all sides with the peripheral walls of said second-shot cavity except adjacent said recess;
   (d) injecting plastic material into said sections to embed said insert in a plastic sheath on opposite sides of said spacer, said material flowing through said recess from one side of said spacer to the opposite side thereof;
   (e) allowing the plastic material last injected to harden around said insert into a finished workpiece incorporating said spacer; and
   (f) removing said workpiece from said second-shot cavity.

2. A method as defined in claim 1 wherein said insert is rod-shaped and is introduced in step (c) into said second mold portion with a terminal section of said second-shot cavity extending beyond at least one end of said insert.

3. A method as defined in claim 2 wherein said insert has a tip cantilevered in said terminal section.

4. A method as defined in claim 2 or 3 wherein said insert has an opposite end projecting beyond said second mold portion during injection in step (d).

5. A method as defined in claim 4 wherein said opposite end is engaged by locators outside said first and second mold portions for accurately positioning said insert in said first-shot and second-shot cavities during injection in steps (b) and (d).

* * * * *